S. R. JARVIS.
Dish-Heater and Holder.
No. 213,904. Patented April 1, 1879.
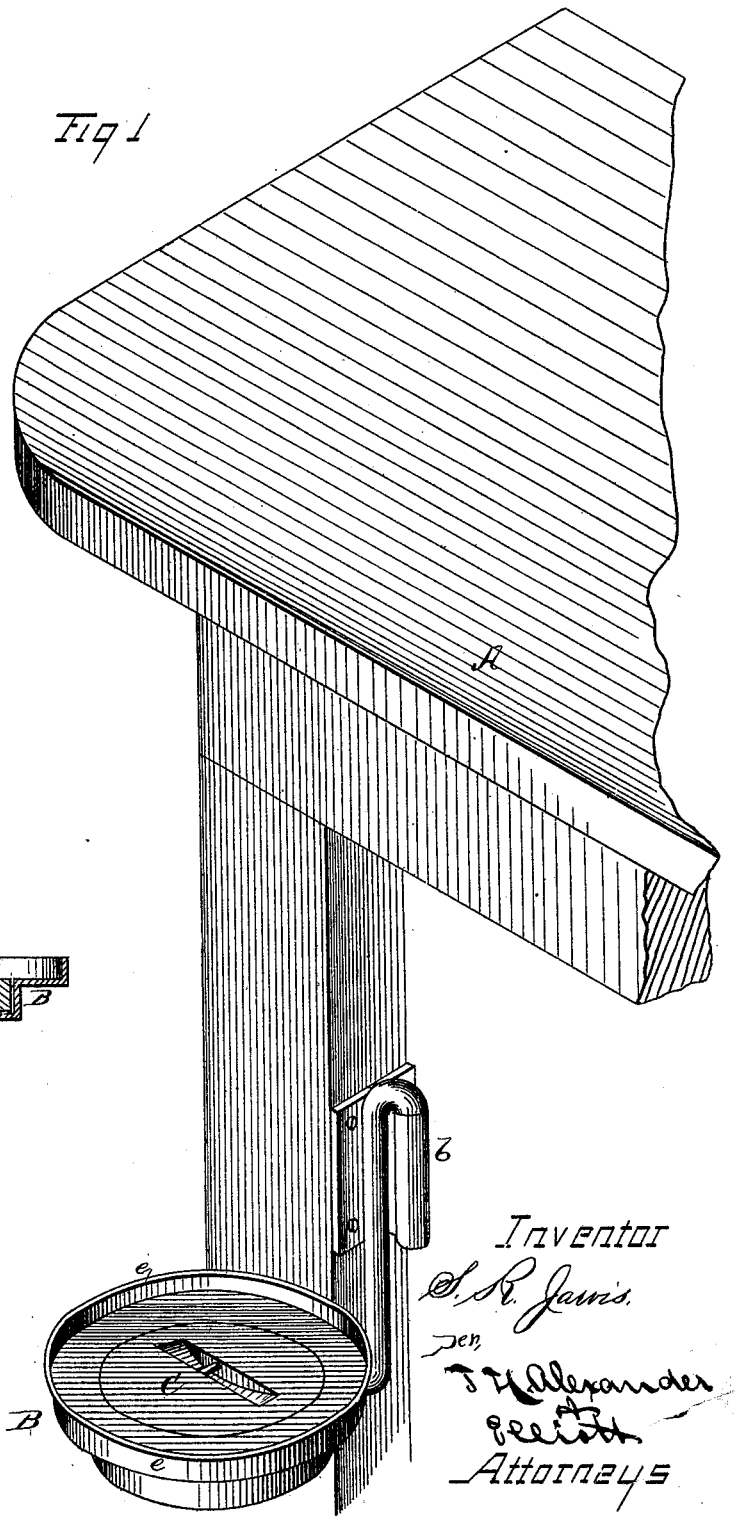

UNITED STATES PATENT OFFICE.

SOLOMON R. JARVIS, OF PHILIPPI, WEST VIRGINIA.

IMPROVEMENT IN DISH HEATER AND HOLDER.

Specification forming part of Letters Patent No. 213,904, dated April 1, 1879; application filed February 11, 1879.

*To all whom it may concern:*

Be it known that I, SOLOMON R. JARVIS, of Philippi, in the county of Barbour and State of West Virginia, have invented certain new and useful Improvements in Dish Heater and Holder; and I do hereby declare that the following is a full, clear, and exact description thereof, reference being had to the accompanying drawings, and to the letters of reference marked thereon, which form part of this specification, in which—

Figure 1 is a perspective of a table with my device attached, and Fig. 2 a vertical section of the heating-bracket.

The object of my invention is to provide a simple and convenient device for heating, or retaining the heat in, coffee, tea, or vegetables, and one which may be easily and quickly turned out of the way or brought into use, as occasion requires.

The nature of my invention consists in the combination of a removable swinging bracket, constructed as and for the purpose hereinafter set forth, with a dining-table.

To enable others skilled in the art to which my invention appertains to make and use the same, I will now proceed to describe its construction and operation.

A represents a common dining-table, having the eye $b$ secured to one of the legs at a suitable and convenient place. B represents the holder or bracket, provided with a gooseneck at its upper end, which is made to slip easily in the eye $b$, and thus enable the bracket to be turned or swung under the table when desired.

It will be observed that I cast the bracket B with a receptacle for the heating-disk C. This disk may be cast of iron, or molded of clay, or any other suitable material for retaining the heat. It should come flush with the top of the holder, and be furnished with means of removing it therefrom when necessary.

The holder B is also cast with the circular flange $c$, as a preventive to the coffee or tea pot from sliding off or being easily upset.

I am well aware that it is not new to construct heaters for purposes similar to mine; but so far as I know they have been made to sit on the tables, thus not only being in the way, but rendering the coffee or tea more liable to be upset and the pot broken. I am aware, also, that, broadly speaking, a swinging bracket is not new. I therefore do not wish to be understood as claiming either the one or the other idea; but What I do claim, and desire to secure by Letters Patent, is—

In combination with a dining-table, the removable swinging bracket B, constructed as described, and provided with the heating-disk C, all arranged substantially as and for the purpose herein set forth.

In testimony that I claim the foregoing as my own I affix my signature in presence of two witnesses.

SOLOMON R. JARVIS.

Witnesses:
 H. N. HALL,
 T. H. ALEXANDER.